Figure 1:
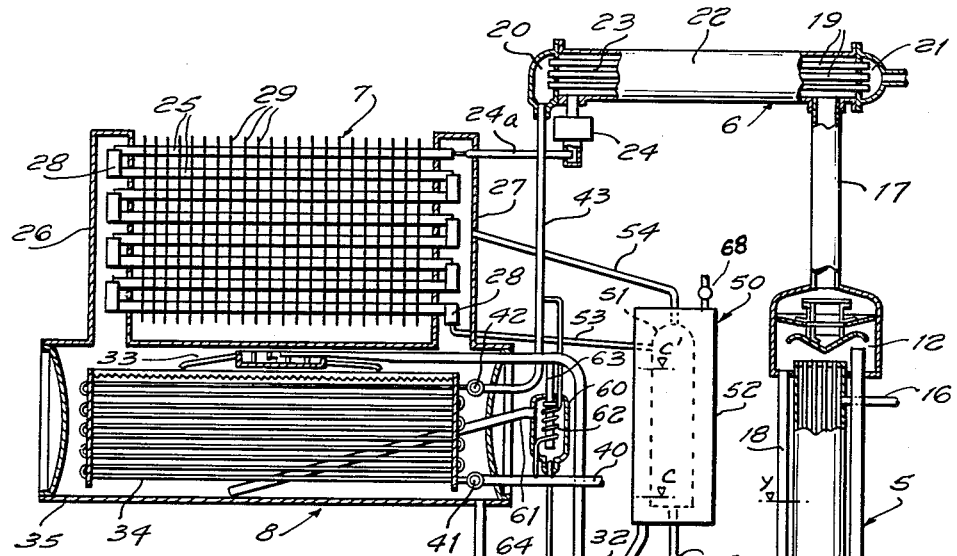

INVENTOR.
Eugene P. Whitlow
BY Oliver S. Titcomb
his ATTORNEY

United States Patent Office 2,751,759
Patented June 26, 1956

2,751,759
ABSORPTION REFRIGERATION

Eugene P. Whitlow, Evansville, Ind., assignor to Servel, Inc., New York, N. Y., a corporation of Delaware Application July 29, 1954, Serial No. 446,589

5 Claims. (Cl. 62—119)

The present invention relates to refrigeration and more particularly to vacuum type absorption refrigeration systems.

Vacuum type absorption refrigeration systems using water as a refrigerant and a salt solution as an absorbent have been extensively used for air conditioning. Such systems operate with an internal pressure considerably below atmospheric and the circulation of refrigerant and absorbent is produced solely by the application of heat. Non-condensable gases are apt to be generated in such systems which interfere with their proper operation. A purging device is usually provided for continuously withdrawing such non-condensable gases from the active part of the system and transferring them to a storage chamber in an inactive part of the system.

A control apparatus also is usually provided for varying the concentration of the absorption solution in accordance with operating conditions. The concentration control comprises a vessel located in a conduit between the high and low pressure sides of the system to maintain a pressure balancing liquid column. The concentration control vessel is connected to receive and store liquid refrigerant in the pressure balancing column in varying amounts depending upon particular operating conditions. Liquid refrigerant in the concentration control vessel is subject to the low pressure of the evaporator and absorber causing it to evaporate and cool the vessel which, in turn, condenses moisture from the ambient air on its surface. The accumulation of condensate on the surface of the vessel is a nuisance and the latent heat of such condensation constitutes a load on the system without producing any useful refrigeration.

One of the objects of the present invention is to provide apparatus in a vacuum type absorption refrigeration system of the type indicated which utilizes the vacuum of the system to insulate the concentration control vessel from the ambient atmosphere.

Another object is to provide a combined concentration control and gas storage element which concurrently prevents condensation of moisture from the ambient air and provides a space for the storage of non-condensable gases.

Still another object of the invention is to provide a combined concentration control and gas storage element which is of simple and compact construction, adapted for economical manufacture and reliable in performing its intended functions.

Figure 2:
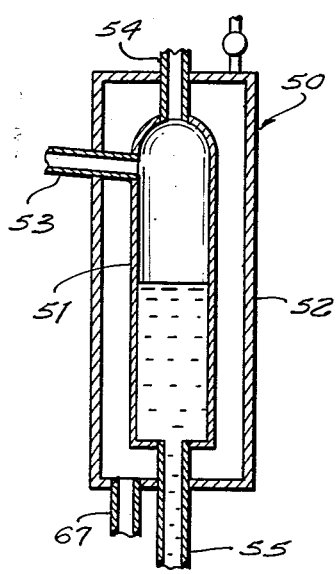

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims. In the drawing:

Fig. 1 is a diagrammatic view of a vacuum type absorption refrigeration system incorporating the combined concentration control and gas storage element of the present invention; and Fig. 2 is an enlarged sectional view of the combined concentration control and gas storage vessel showing refrigerant stored out of solution and the non-condensable gases forming an insulating barrier around the concentration control vessel.

In Fig. 1 of the drawings, the present invention is shown applied to an absorption refrigeration system of the type which operates in a partial vacuum and utilizes water as a refrigerant and a salt solution as an absorbent. The refrigeration system as illustrated is generally similar to that described and claimed in U. S. Letters Patent to A. R. Thomas et al. No. 2,282,503 issued May 12, 1942. Suffice it to state herein that the refrigeration system comprises a combined generator and vapor liquid-lift 5, a condenser 6, an evaporator 7, an absorber 8 and a liquid heat exchanger 9 interconnected for the circulation of refrigerant and absorbent.

The combined generator and vapor liquid-lift 5 comprises a plurality of vertically arranged lift tubes 10 connected at their lower ends to a receiving chamber 11 and at their upper ends to a separating chamber 12. A shell or jacket 13 surrounds the tubes 10 and provides a heating chamber 14. Steam from any suitable source is supplied to the chamber 14 through a conduit 15 and a vent pipe 16 adjacent the top of the shell 13 maintains the steam in the chamber at atmospheric pressure and temperature. A vapor pipe 17 projects upwardly and a liquid pipe depends downwardly from the separating chamber 12. It will be understood that other forms of combined generator and vapor liquid-lift 5 can be used in place of the one illustrated herein such as the single tube droplet type lift described and claimed in my prior U. S. Letters Patent No. 2,625,801, and U. S. Letters Patent of N. E. Berry No. 2,625,800, and W. M. Simpson No. 2,625,803, issued January 20, 1953.

The refrigerant path comprises the generator 5, condenser 6 and evaporator 7. Vapor pipe 17 is connected to the condenser 6 illustrated as a surface type having a plurality of heat exchange tubes 19 extending between headers 20 and 21 and enclosed by a shell 22 to provide a chamber 23. Cooling water flowing from header 20 through the tubes 19 to header 21 condenses the refrigerant vapor on the surface of the tubes in the chamber 23. Liquid refrigerant flows from the condenser 6 through an orifice device 24 and conduit 24a to the evaporator 7. The orifice device 24 is like that described and claimed in U. S. Letters Patent of N. E. Berry No. 2,563,575, issued August 7, 1951, and permits the simultaneous flow of liquid refrigerant and non-condensable gases from the condenser 6 to the evaporator 7 while maintaining a difference in pressure. Evaporator 7 comprises a plurality of substantially horizontal tubes 25 extending between headers 26 and 27 and arranged one over the other from top to bottom. Adjacent tubes 25 have liquid receiving cups 28 at opposite ends in the headers 26 and 27 which underlie the end of the next uppermost tube so that liquid refrigerant continuously flows through successive tubes from the top to the bottom of the evaporator. Heat transfer fins 29 are arranged in spaced relation on and in thermal contact with the plurality of evaporator tubes 25. The evaporator 7 is supported by the absorber 8 with its headers 26 and 27 attached to and opening into the top of the absorber.

The solution circuit comprises the generator 5, absorber 8, liquid heat exchanger 9 and connecting conduit to provide separate paths of flow for solution weak in refrigerant and solution strong in refrigerant. The liquid heat exchanger 9 is preferably of the type described and claimed in the U. S. Letters Patent to Walter M. Simpson No. 2,456,455, issued December 14, 1948, having separate passages 30 and 31 in heat exchange relation. Absorption liquid weak in refrigerant flows from the separating chamber 12 through conduit 18, outer passage 30 of the liquid heat exchanger 9 and conduit 32 to a liquid distributor 33 at the top of the absorber 8. The absorber 8 comprises a plurality of horizontal tubes 34 connected to provide serpentine coils arranged vertically in side by side relationship and a shell 35 enclosing the liquid distributor 33 and tubes. The liquid distributor 33 delivers absorption solution weak in refrigerant onto the top of the uppermost horizontal tubes of each vertical row which drips from tube to tube from the top to the bottom of the serpentine coils. This produces a distribution of absorption solution in an extended surface or film on the tubes and due to the affinity of the absorbent for refrigerant, it absorbs the refrigerant at the vapor pressure of the refrigerant in the absorbent at the particular operating temperature. Absorption solution strong in refrigerant flows by gravity from the absorber 8 through a conduit 36, inner passage 31 of liquid heat exchanger 9, conduit 37, leveling vessel 38 and conduit 39 back to chamber 11 of the generator 5 to complete a cycle.

The heat of condensation and absorption is removed by cooling water directed through the tubes 19 of the condenser 6 and tubes 34 of the absorber 8 in succession. To this end, cooling water is supplied from any suitable source such as a city water main or cooling tower through a conduit 40 to a header 41 connecting the ends of the lowermost tubes 34 in the absorber 8 and the ends of the uppermost tubes are connected to a header 42. The cooling water flows from header 41 through conduit 43 to the header 20 of the condenser 6 and then through the tubes 19 of the condenser to the header 21. Cooling water from header 21 is discharged to waste or returned to a cooling tower, as the case may be.

The combined generator and vapor liquid-lift 5 and condenser 6 operate at one pressure, for example, 60 mm. Hg corresponding to a condenser temperature of 105° F., and the evaporator 7 and absorber 8 operate at a lower pressure, for example, 8 mm. Hg corresponding to the vapor pressure of the refrigerant in the absorbent at an absorber temperature of 85° F. The difference in pressure between the high and low pressure sides of the system is maintained by the orifice device 24 between the condenser 6 and evaporator 7 and by liquid columns in the conduits 32 and 36 connecting the absorber 8 to the liquid heat exchanger 9. During operation of the system liquid will stand at some level X in the levelling chamber 37, at level Y in the conduit 18 and at level Z in the conduit 36. As thus far described the refrigeration system is substantially the same as those known and used for air conditioning.

In accordance with the present invention a combined concentration control and gas storage element 50 is provided for varying the concentration of the absorption solution circulating in the system in acordance with changes in operating conditions and for storing non-condensable gases removed from the active part of the system. The element 50 comprises an inner concentration control vessel 51 and an outer gas storage vessel 52 surrounding the concentration control vessel in spaced relation thereto. The gas storage vessel 52 is adapted to store non-condensable gases at a very low partial vacuum and thereby provides a heat insulating barrier between the concentration control vessel 51 and the ambient atmosphere. The insulating barrier of low pressure gas prevents the condensation of moisture from atmospheric air and a refrigeration loss to the system resulting from such condensation.

The concentration control vessel 51 is connected in a conduit between the evaporator 7 and inlet chamber 11 at the base of the generator 5 and is so located relative to the other elements of the system as to maintain a pressure balancing liquid column. Concentration control vessel 51 is connected to the lowermost cup 28 of the evaporator 7 by a conduit 53 to deliver unevaporated liquid refrigerant overflowing from the bottom of the evaporator to the interior of the vessel. The upper end of the vessel 51 is connected to the header 27 of the evaporator 7 by a vent tube 54. The bottom of the concentration control vessel 51 is connected to the chamber 11 at the base of the generator 5 by a conduit 55. The difference in pressure between the high and low pressure sides of the system varies with the cooling water temperature so that a pressure balancing column of liquid refrigerant will fall to the level C at a low cooling water temperature. On the other hand, with a high cooling water temperature a greater difference in pressure between the high and low pressure sides of the system will exist and maintain a column of liquid refrigerant to the level C' in the concentration control vessel.

Non-condensable gases are continually withdrawn from an active part of the refrigeration system by a purging device 60 and transferred to the gas storage vessel 52 surrounding the concentration control vessel 51. The purging device 60 is like that described and claimed in the reissue patent to C. A. Roswell Re. 23,093, issued March 22, 1949. Suffice it to state that the purging device 60 is in the form of an auxiliary absorber vessel connected to the bottom of the absorber 8 by a suction tube 61. A cooling coil 62 at the interior of the purging device 60 is connected in the cooling water circuit across the absorber coils 34 between the conduits 40 and 43. Absorption solution weak in refrigerant is fed through a restricted feed pipe 63 from the conduit 32 and flows over the cooling coil 62. The auxiliary absorber of the purging device 60 operates at a lower vapor pressure than the absorber 8 and withdraws non-condensable gases mixed with refrigerant vapor from the absorber 8 through the suction tube 61. Refrigerant vapor is absorbed in the absorption solution in the purging device 60 and segregates the non-condensable gases therein. Liquid flows from the purging device 60 through a fall tube 64 in successive slugs and traps pockets of gas therebetween which are transferred to a separating chamber 65 as described and claimed in U. S. Letters Patent to Lowell McNeely No. 2,473,384, issued June 14, 1949. The bottom of the separating chamber 65 is connected by a conduit 66 to the conduit 36 for returning solution to the generator and the side of the separating chamber is connected by a riser 67 to the bottom of the gas storage vessel 52. A valved connection 68 is provided at the top of the gas storage vessel 52 for detachable connection with a suitable pump for removing the non-condensable gases from the vessel when necessary, for example, once every one or two years. One form of the invention having now been described in detail, the mode of operation is explained as follows.

To start operation of the refrigeration system, steam from any source is supplied through the conduit 15 to the chamber 14 of the combined generator and vapor liquid-lift 5 and the steam is maintained at atmospheric pressure by the vent conduit 16. Heat from the steam is transferred through the tubes 10 to expel refrigerant vapor from the absorption solution therein and the expelled vapor is utilized to lift solution into the separating chamber 12. The refrigerant vapor then flows through the vapor pipe 17 to the condenser 6 where it is condensed to a liquid and the liquid refrigerant flows from the condenser through the orifice device 24 and conduit 24a into the uppermost tube 25 of the evaporator 7. The liquid refrigerant flows by gravity through each tube 25 of the evaporator 7 into the cup 28 at the end of the next lowermost tube for continuous flow from the top to the bottom of the evaporator.

Simultaneously with the flow of refrigerant through the refrigerant circuit, absorption solution weak in refrigerant flows from the separating chamber 12 through the conduit 18, outer passage 30 of the heat exchanger 9 and conduit 32 to the liquid distributor 33 in the absorber 8. The absorption solution is distributed for uniform flow over the surface of the coils 34 in the absorber. Due to the high affinity of the absorbent for refrigerant vapor, the latter is absorbed in the absorber 8 at a low vapor pressure. This reduces the vapor pressure of the refrigerant in the evaporator tubes 25 which evaporates at a low temperature and pressure to produce a refrigerating effect on air or other medium circulated over the exterior of the tubes. The refrigerant vapor flows from the evaporator tubes 25 into the headers 26 and 27 and through the headers into the absorber 8 where it is absorbed. Absorption solution strong in refrigerant then flows by gravity from the absorber 8 to the chamber 11 at the base of the generator 5 in a path of flow including the conduit 36, inner passage 31 of liquid heat exchanger 9, conduit 37, leveling vessel 38 and conduit 39. During operation of the system the difference in pressure between the absorber 8 and generator 5 is maintained by liquid columns in the conduits 32 and 36.

During operation of the system, liquid absorbent rises in the conduit 55 to the level Z indicated in the conduit 36. With a relatively dilute solution of absorbent in the absorber 8 the vapor pressure of refrigerant in absorbent is relatively high with a corresponding high vapor pressure and temperature of the refrigerant in the tubes 25 of the evaporator 7. With a high evaporator temperature, all of the liquid refrigerant supplied is not evaporated and overflows from the evaporator 7 through the conduit 53 into the concentration control vessel 51 where it is stored out of solution. This overflow and storage of liquid refrigerant continues until an equilibrium condition is produced at which the concentration of absorbent in the absorber 8 causes all of the refrigerant supplied to the evaporator 7 to be evaporated therein. Liquid refrigerant overflowing from evaporator 7 displaces the heavier absorbent solution in the conduit 55 until it stands at some level between C and C' in the concentration control vessel 51 depending upon the operating conditions which produce a particular difference in pressure between the high and low pressure sides of the system. As stated above with relatively cold cooling water, the difference in pressure will be at a minimum and the liquid in the concentration control will stand at or below a level C but with a high cooling water temperature the difference in pressure will be at a maximum with the liquid standing in the concentration control vessel at or below the level C'. Thus, the concentration control operates automatically to vary the amount of liquid refrigerant stored out of solution in accordance with variations in operating conditions such as the temperature of the cooling water.

Any non-condensable gases occurring in the combined generator and vapor liquid-lift 5 are swept with vapor through the vapor conduit 17 into the condenser 6 and the gases flow from the condenser through the orifice device 24 into the evaporator 7. Non-condensable gases in the evaporator 7 are swept with vapor into the absorber 8 and accumulate at the bottom and center of the absorber where turbulence is at a minimum. The non-condensable gases are continually withdrawn by the purging device 60 and transferred to the storage vessel 52 surrounding the concentration control vessel 51. The non-condensable gases are then stored in the vessel 52 at a very low pressure and density which, in effect, produces a vacuum insulating barrier between the concentration control vessel 51 and the atmospheric ambient. The insulating barrier of low pressure gases prevents the transfer of heat from the atmospheric ambient to the concentration control vessel 51 and thereby reduces the heat loss of the concentration control vessel to a minimum. Also, the insulating barrier of low pressure gases prevents the gas storage vessel from being cooled below the dew point of the atmospheric air and thereby prevents condensation of moisture or sweating.

It will now be observed that the present invention provides a construction which utilizes the vacuum of a vacuum type absorption refrigeration system to insulate the concentration control vessel from the atmospheric ambient. It will also be observed that the present invention provides a combined concentration control and gas storage element which insulates the concentration control vessel from the atmospheric ambient and provides a gas storage space isolated from the active parts of the system. It will still further be observed that the present invention provides a combined concentration control vessel and gas storage element which is of simple and compact construction adapted for economical manufacture and reliable operation.

While a single embodiment of the present invention is herein illustrated and described, it will be understood that modifications may be made in the construction and arrangement of elements without departing from the spirit or scope of the invention. Therefore, without limitation in this respect, the invention is defined by the following claims.

I claim:

1. In a vacuum type absorption refrigeration system in which non-condensable gases are apt to occur that interfere with the proper operation of the system, a concentration control vessel connected in the system to receive and store unevaporated liquid refrigerant out of solution, a gas storage vessel enclosing the concentration control vessel, and a purging device for withdrawing non-condensable gases from one part of the system and transferring them to the storage vessel to provide a low pressure gas barrier between the concentration control vessel and atmospheric ambient.

2. In a vacuum type absorption refrigeration system in which non-condensable gases are apt to occur that interfere with the proper operation of the system, a combined concentration control and gas storage element comprising two vessels arranged one within the other in spaced relation, the inner vessel being connected to receive and store unevaporated liquid refrigerant out of solution, and a purging device for withdrawing non-condensable gases from the refrigeration system and transferring them to the outer vessel, and the gas storage space between the inner and outer vessels providing a vacuum insulating barrier between the inner vessel and the atmospheric ambient.

3. In a vacuum type absorption refrigeration system having a high pressure side comprising a generator and condenser and a low pressure side comprising an evaporator and absorber, conduits connecting the high and low pressure sides of the system for maintaining pressure balancing liquid columns, a concentration control vessel in one of the conduits and connected to receive and store liquid refrigerant overflowing from the evaporator in a pressure balancing liquid column, a gas storage vessel surrounding the concentration control vessel in spaced relation thereto, and a purging device for withdrawing non-condensable gases from the absorber and transferring them to the gas storage vessel where they are stored at low pressure to provide a heat insulating barrier around the concentration control vessel.

4. In a vacuum type absorption refrigeration system utilizing water as a refrigerant and a salt solution as an absorbent, a combined generator and vapor liquid-lift, a condenser, an evaporator, an absorber, conduits interconnecting the elements to provide a high pressure side comprising the generator and condenser and a low pressure side comprising the evaporator and absorber, the elements being arranged to produce pressure balancing liquid columns in the conduits connecting the high and low pressure sides of the system, and a combined concentration control and gas storage element comprising two vessels arranged one within the other in spaced relation, the inner vessel being connected between the evaporator and generator to receive and store liquid refrigerant overflowing from the evaporator in a pressure balancing liquid column, and a purging device for withdrawing non-condensable gases from the system and transferring them to the space between the inner and outer vessels.

5. In a vacuum type absorption refrigeration system utilizing water as a refrigerant and a salt solution as an absorbent, a refrigerant circuit comprising a combined generator and vapor liquid-lift and a condenser, a solution circuit comprising the combined generator and vapor liquid-lift and absorber, said evaporator and absorber being located above the base of the generator, and conduits connecting the generator and absorber for providing separate paths of flow for absorbent weak in refrigerant and absorbent strong in refrigerant and maintaining pressure balancing liquid columns therein, a conduit connecting the evaporator to the generator and having a concentration control vessel for receiving and storing liquid refrigerant overflowing from the evaporator in a pressure balancing liquid column, a gas storage vessel surrounding the concentration control vessel in spaced relation thereto, and a purging device for withdrawing non-condensable gases from the absorption solution circuit and transferring them to the gas storage vessel.

References Cited in the file of this patent

UNITED STATES PATENTS

| | | |
|---|---|---|
| 2,138,885 | Ross | Dec. 6, 1938 |
| 2,400,137 | Reid | May 14, 1946 |
| 2,563,575 | Berry | Aug. 7, 1951 |
| 2,648,204 | Grubb | Aug. 11, 1953 |